(12) United States Patent
Licata

(10) Patent No.: US 11,944,233 B1
(45) Date of Patent: Apr. 2, 2024

(54) STEAMER INSERT

(71) Applicant: Anna Marie Licata, Ventura, CA (US)

(72) Inventor: Anna Marie Licata, Ventura, CA (US)

( * ) Notice: Subject to any disclaimer, the term of this patent is extended or adjusted under 35 U.S.C. 154(b) by 303 days.

(21) Appl. No.: 16/908,934

(22) Filed: Jun. 23, 2020

(51) Int. Cl.
*A47J 36/20* (2006.01)
*A47J 27/04* (2006.01)

(52) U.S. Cl.
CPC .............. *A47J 36/20* (2013.01); *A47J 27/04* (2013.01); *A47J 2027/043* (2013.01)

(58) Field of Classification Search
None
See application file for complete search history.

(56) References Cited

U.S. PATENT DOCUMENTS

| | | | |
|---|---|---|---|
| 5,195,424 A | 3/1993 | Guajaca | |
| 5,575,198 A * | 11/1996 | Lowery | A47J 43/18 99/426 |
| 5,816,139 A | 10/1998 | Scorta Paci | |
| 6,167,799 B1 | 1/2001 | Macias | |
| 9,445,685 B1 | 9/2016 | Diaz | |
| 9,505,542 B2 | 11/2016 | France et al. | |
| 2006/0254431 A1* | 11/2006 | Mariano et al. | A47J 37/12 99/415 |
| 2012/0067902 A1* | 3/2012 | Maffei | A47J 27/00 220/573.1 |
| 2012/0282385 A1* | 11/2012 | Levy et al. | A47J 37/10 426/510 |

FOREIGN PATENT DOCUMENTS

| | | | | |
|---|---|---|---|---|
| CN | 201977541 U | * | 9/2011 | ............. A47J 27/05 |
| CN | 106691209 A | * | 6/2017 | ............. A47J 36/20 |
| CN | 107198457 A | * | 9/2017 | ............. A47J 27/16 |
| CN | 107692851 A | * | 2/2018 | ............. A47J 36/20 |
| CN | 109549497 A | * | 4/2019 | ............. A47J 36/20 |
| KR | 200436173 Y1 | * | 6/2007 | ............. A47J 27/026 |
| KR | 20110009712 U | * | 10/2011 | ............. A47J 27/026 |
| KR | 101142320 B1 | * | 5/2012 | ............. A47J 36/20 |

OTHER PUBLICATIONS

Machine translation of CN 107198457 A performed on Jun. 27, 2022, Yang (Year: 2017).*
Machine translation of KR 20110009712 U performed on Jun. 27, 2022, Lee (Year: 2011).*
Machine translation of CN 106691209 A performed on Jun. 27, 2022, Yang et al. (Year: 2017).*
Machine translation of CN 201977541 U performed on Jun. 28, 2022, Yuan (Year: 2011).*
Yunnan Steam Pot, Jun. 23, 2019, The Wok Shop, Wayback Machine (Year: 2019).*
Machine translation of KR 200436173 Y1 performed on Oct. 12, 2022, Park (Year: 2007).*

(Continued)

*Primary Examiner* — Dana Ross
*Assistant Examiner* — Kevin Guanhua Wen
(74) *Attorney, Agent, or Firm* — Cramer Patent & Design PLLC; Aaron R. Cramer

(57) ABSTRACT

A steamer insert includes a circular tray having a plurality of apertures disposed therein. An upward conical funnel is disposed within the center of the tray. The tray is supported on a plurality of legs disposed upon an underside surface thereof.

1 Claim, 8 Drawing Sheets

(56) References Cited

OTHER PUBLICATIONS

Machine translation of CN 107692851 A performed on Oct. 13, 2022, Chen et al. (Year: 2018).*
Machine translation of KR 101142320 B1 performed on Oct. 13, 2022, Song (Year: 2012).*
Machine translation of CN 109549497 A performed on May 31, 2023, Yan (Year: 2019).*
Libertyware Steamer/Tamale Platform, 30qt Size—Aluminum—TAM30. Product Listing [online]. Copyright @ 2020 ChefsFirst. [retrieved on Dec. 6, 2019]. Retrieved from the Internet: <URL: https://www.chefsfirst.com/ProductDetails.asp?ProductCode=LWTAM30&click=2&gclid=Cj0KCQiAz53vBRCpARIsAPPsz8XIICymulNB8_OQF4emsIch8k6TUgE6L2NRiQJbWbTRB41G2E3EDm4aAniMEALw_wcB>.
Steamer Basket Stainless Steel Vegetable Steamer Basket Folding Steamer Insert for Veggie Fish Seafood Cooking, Expandable to Fit Various Size Pot (5.1" to 9") . Product Listing [online] @ 1996-2020, Amazon.com, Inc. [retrieved on Dec. 6, 2019]. Retrieved from Internet: <URL: https://www.amazon.com/Steamer-Stainless-Vegetable-Folding-Expandable/dp/B06Y4MCKEM?th=1.
OXO Stainless Steel Good Grips Steamer with Extendable Handle, 7" . Product Listing [online] @ 1996-2020, Amazon.com, Inc. [retrieved on Dec. 6, 2019]. Retrieved from Internet: <URL: https://www.amazon.com/OXO-Stainless-Steamer-Extendable-Handle/dp/B000HCBDF2?th=1.
Classic 3 qt. Stainless Stack N Steam Saucepot. Product Listing [online]. @ 2000-2020, Home Depot Product Authority, LLC. [retrieved on Dec. 6, 2019]. Retrieved from Internet: <URL: https://www.homedepot.com/p/Farberware-Classic-Series-3-qt-Stainless-Steel-Stack-N-Steam-Sauce-Pot-70043/100487182.
Imusa 20qt Tamale/Seafood Steamer with Rack & Lid. Product Listing [online] @ 2020, Target Brands, Inc. [retrieved on Dec. 6, 2019]. Retrieved from Internet: <URL: https://www.target.com/p/imusa-20qt-tamale-seafood-steamer-with-rack-38-lid/-/A-10827023.

* cited by examiner

STEAMER INSERT

RELATED APPLICATIONS

None.

FIELD OF THE INVENTION

The presently disclosed subject matter is directed to an insert and more specifically to a steamer insert.

BACKGROUND OF THE INVENTION

Tamales are a delicious food with a long history steeped in tradition. While these corn dough and meat delights wrapped in a corn husk are often ordered in a restaurant—it is not uncommon for the tamales to be made at home. Given the nature of how a tamale is made however sometimes makes them a difficult food to keep warm without over cooking. Being traditionally steamed cooked—the tamales may prove difficult for many home chefs who may add too much water to the steaming process resulting in lengthy cook times and soaked tamales.

The steamer insert overcomes this problem by permitting a user to keep the tamales out of and above a given water source while in a steamer. The steamer insert also permits a user to add additional water to the steamer without needlessly soaking the tamales. As a result, the steamer insert provides a solution to over steamed/watered tamales in a manner that is quick, easy and cost effective.

SUMMARY OF THE INVENTION

The principles of the present invention provide for a steamer insert which comprises a support surface having a flat surface with an outer ridge around the perimeter of the support surface, and a top. The steamer insert also comprises a center cylinder having a base coupled to the support surface, a cylinder ridge, a cylinder rim, and a hole. The center cylinder is a partial cone having tapered edges that narrow as the center cylinder extends orthogonally away from the support surface. The steamer insert also comprises a plurality of elevator legs which have at least three extension pieces of metal to elevate the support surface above a plurality of heated water in a container.

The steamer insert may also comprise three rings of apertures which concentrically surround the center cylinder. The three rings of apertures may include a ring of outer steam apertures, a ring of middle steam apertures, and a ring of inner steam apertures. The support surface may be circular and may be made of metal. The cylinder ridge may surround the outer surface of the cylinder rim and may act as a support for receiving an optional graduated cylinder extension piece. The center cylinder may have a generally cylindrical protrusion. The hole may receive one or more refills of water therein and may allow the one or more refills of water to funnel through the center cylinder beneath the steamer insert device. The center cylinder may be hollow to serve as a reverse funnel for guiding a plurality of poured fluids from the hole beneath the steamer insert device. Food items may be stacked upright and are inwardly facing against the center cylinder. The elevator legs may allow steam from the heated water to rise up through the apertures in the outer steam apertures, in the middle steam apertures, and in the inner steam apertures to heat and cook a food item resting on the support surface.

The center cylinder may have a base two inches in width and four inches in height. The elevator legs may be spaced out in an equidistant manner on a bottom portion of the support surface. The elevator legs may be made of a tubular wire or a metal. The elevator legs may include a flattened inner edge. The elevator legs may have at least three extension pieces of generally "V"-shaped metal. The steamer insert device may have a base eleven inches in length.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
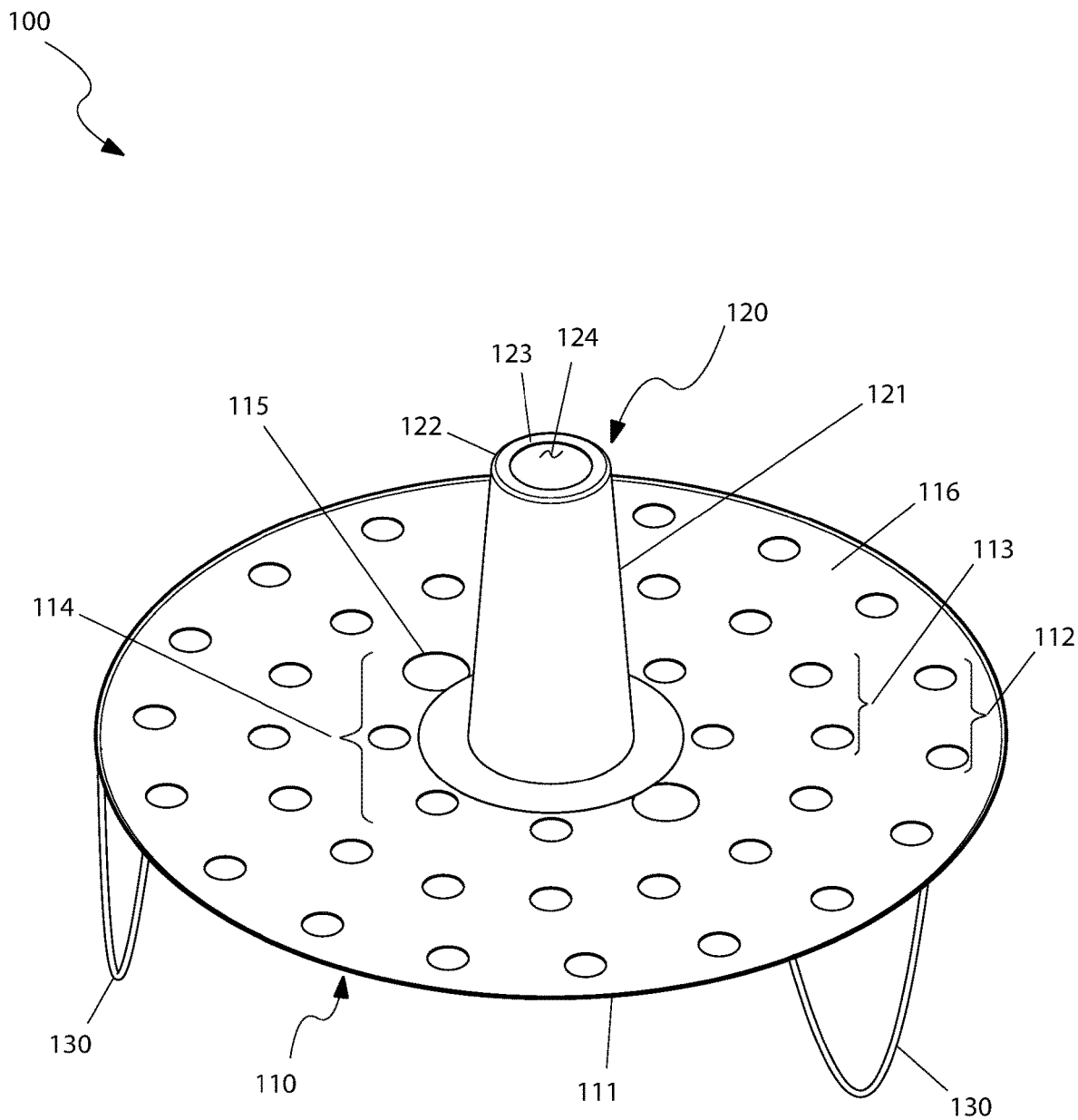
FIG. 1 is a top perspective view of the steamer insert device, according to the preferred embodiment of the present invention.

100 steamer insert device
110 support surface
111 outer ridge
112 outer steam apertures
113 middle steam apertures
114 inner steam apertures
115 enlarged aperture
116 top
117 bottom
120 center cylinder
121 base
122 cylinder ridge
123 cylinder rim
124 hole
130 elevator legs

DESCRIPTION OF THE PREFERRED EMBODIMENTS

The best mode for carrying out the invention is presented in terms of its preferred embodiment, herein depicted within FIGS. 1 through 8. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Referring now to FIG. 1, a top perspective view of the steamer insert device 100, according to the preferred embodiment of the present invention is disclosed. The steamer insert device 100 may include a support surface 110, a center cylinder 120, and elevator legs 130. The support surface 110 may be structured as a circular, flat metal surface having an outer ridge 111 around the perimeter of the support surface 110, a top 116, and three (3) rings of apertures concentrically surrounding the center cylinder 120 including a ring of outer steam apertures 112, middle steam apertures 113, and inner steam apertures 114. The inner steam apertures may also include at least one (1) enlarged aperture 115. The center cylinder 120 may be configured as a partial cone or generally cylindrical protrusion having tapered edges that narrow slightly as the center cylinder 120 extends orthogonally away from the support surface 110. The center cylinder 120 may include an elongated base 121 coupled to the support surface 110, a cylinder ridge 122, a cylinder rim 123, and a hole 124. The cylinder ridge 122 surrounds the outer surface of the cylinder rim 123 and may act as a support for receiving an optional graduated cylinder extension piece there upon. The hole 124 is configured to receive refills of water therein and allow the water to funnel through the center cylinder 120 to a container of heated water beneath the device 100. The elevator legs 130 may include at least three (3) extension pieces of generally "V"-shaped metal suited to elevate the support surface 110 above heated water in a container. The elevator legs 130 allow steam from the heated water source to rise up through the apertures in the outer steam apertures 112, middle steam apertures 113, and inner steam apertures 114 to heat and cook a food item resting on the support surface 110.

Figure 2:
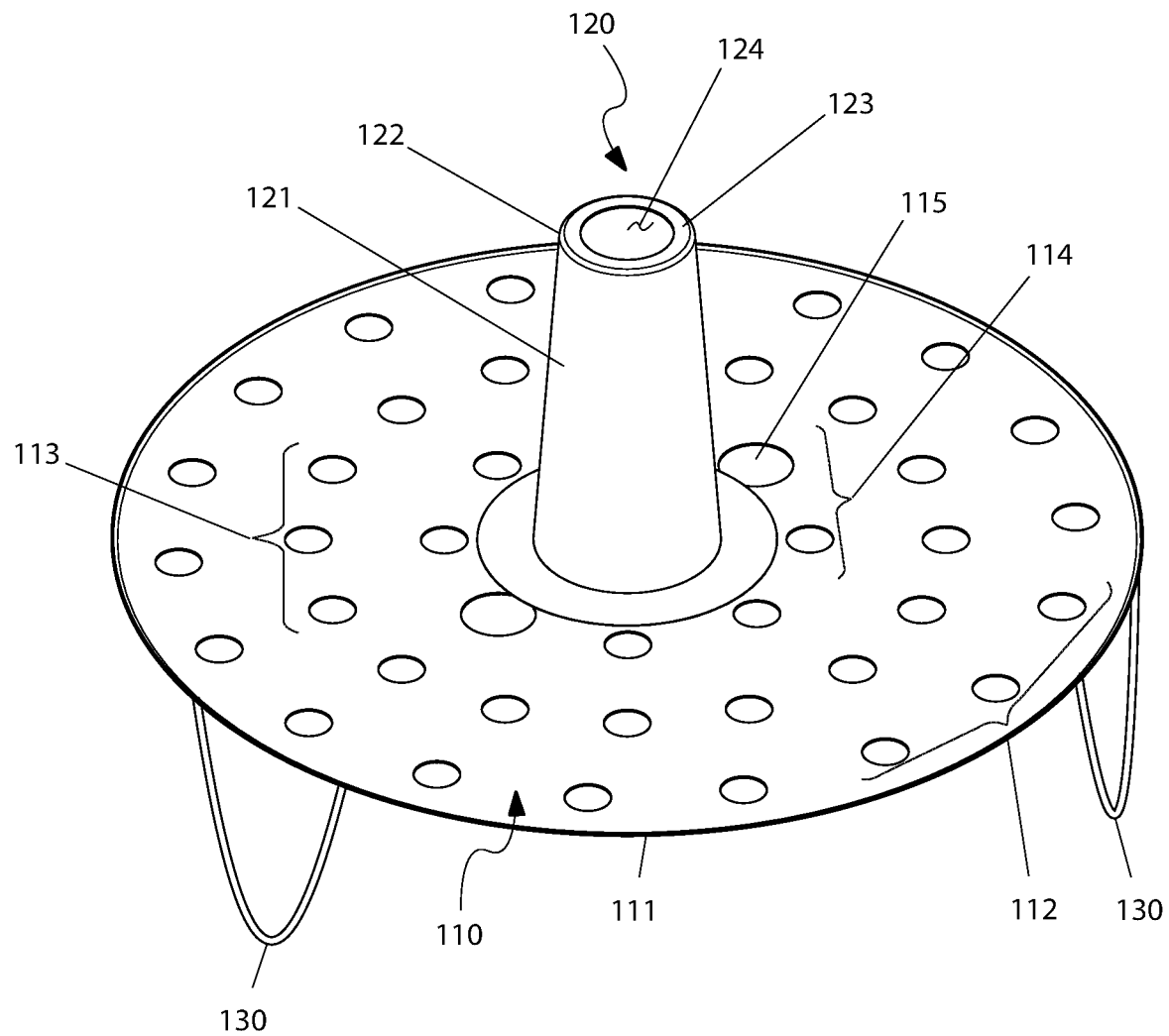
FIG. 2 is another top perspective view of the steamer insert device, according to the preferred embodiment of the present invention.
Figure 3:
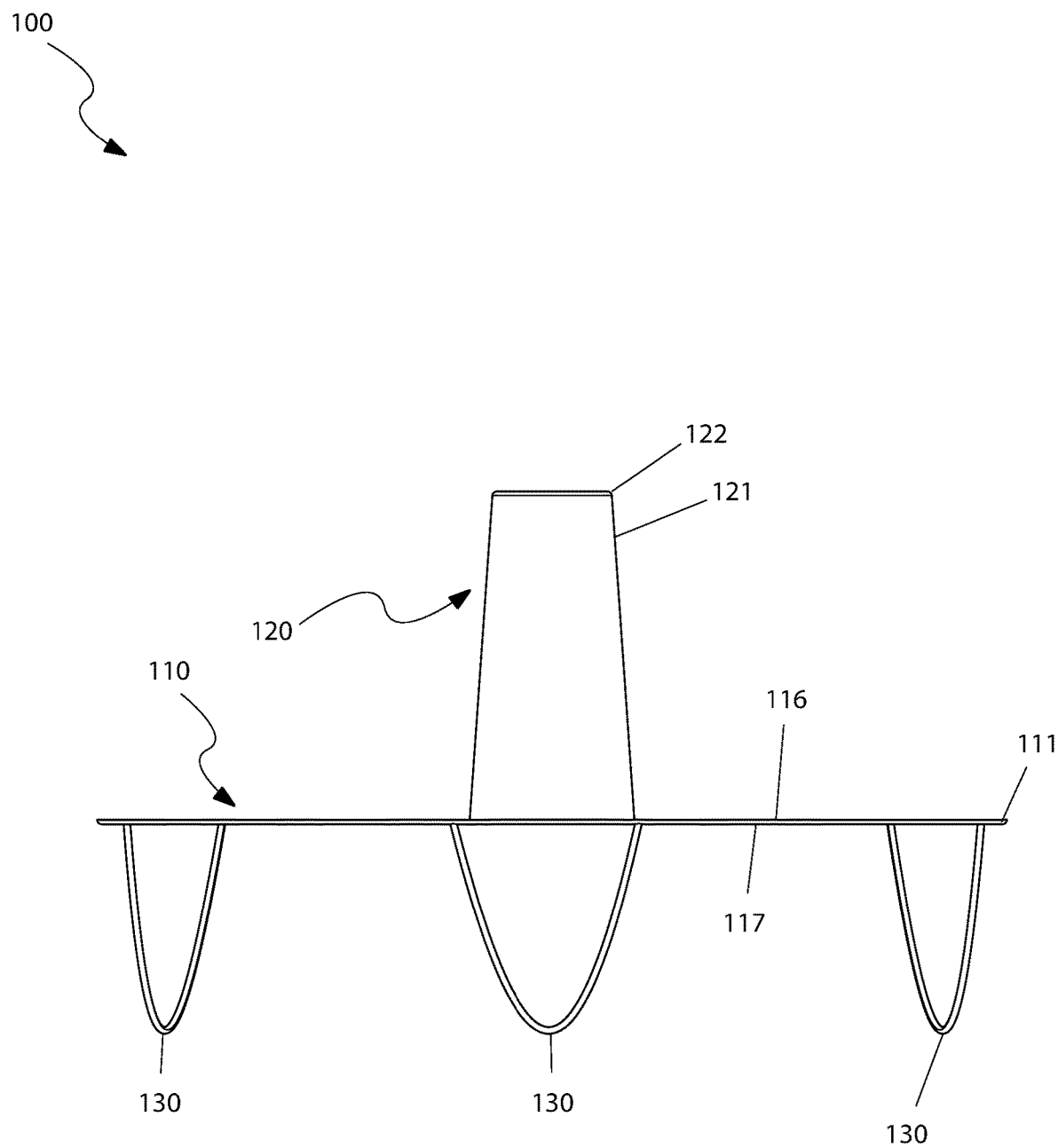
FIG. 3 is a side view of the steamer insert device, according to the preferred embodiment of the present invention.
Figure 4:
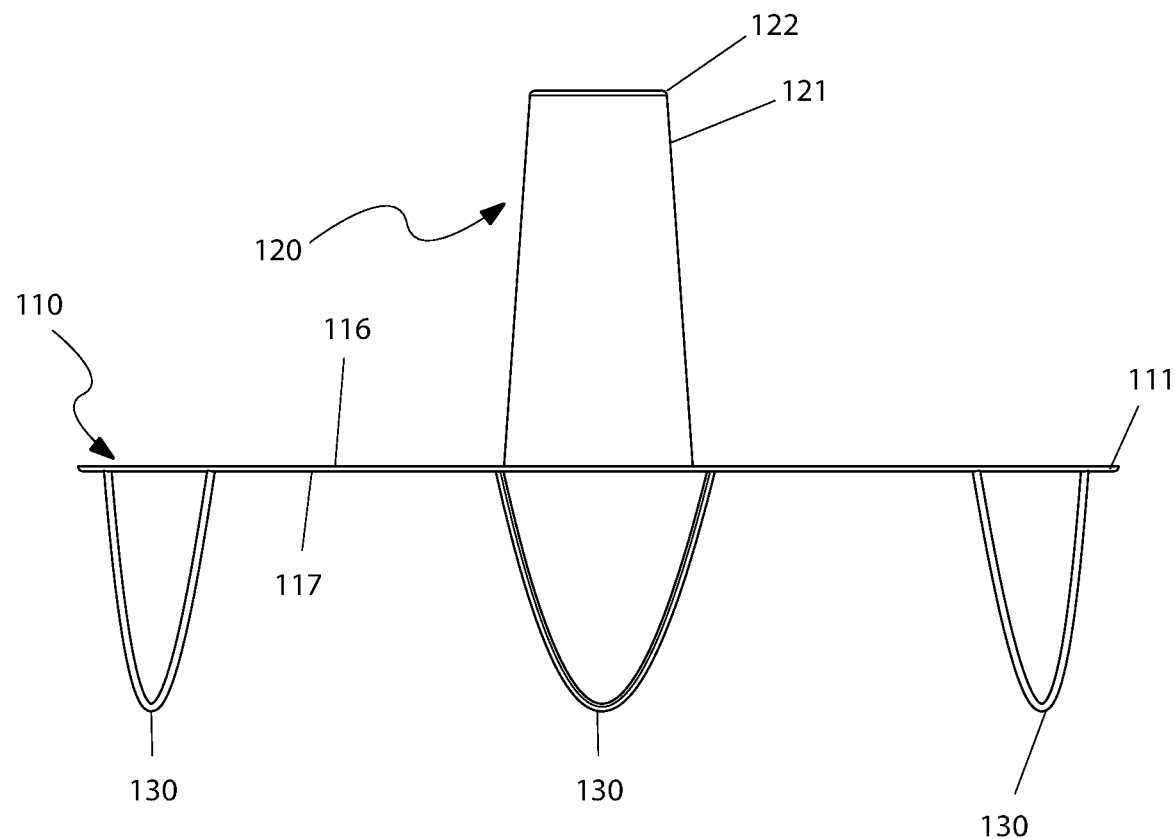
FIG. 4 is another side view of the steamer insert device, according to the preferred embodiment of the present invention.
Figure 5:
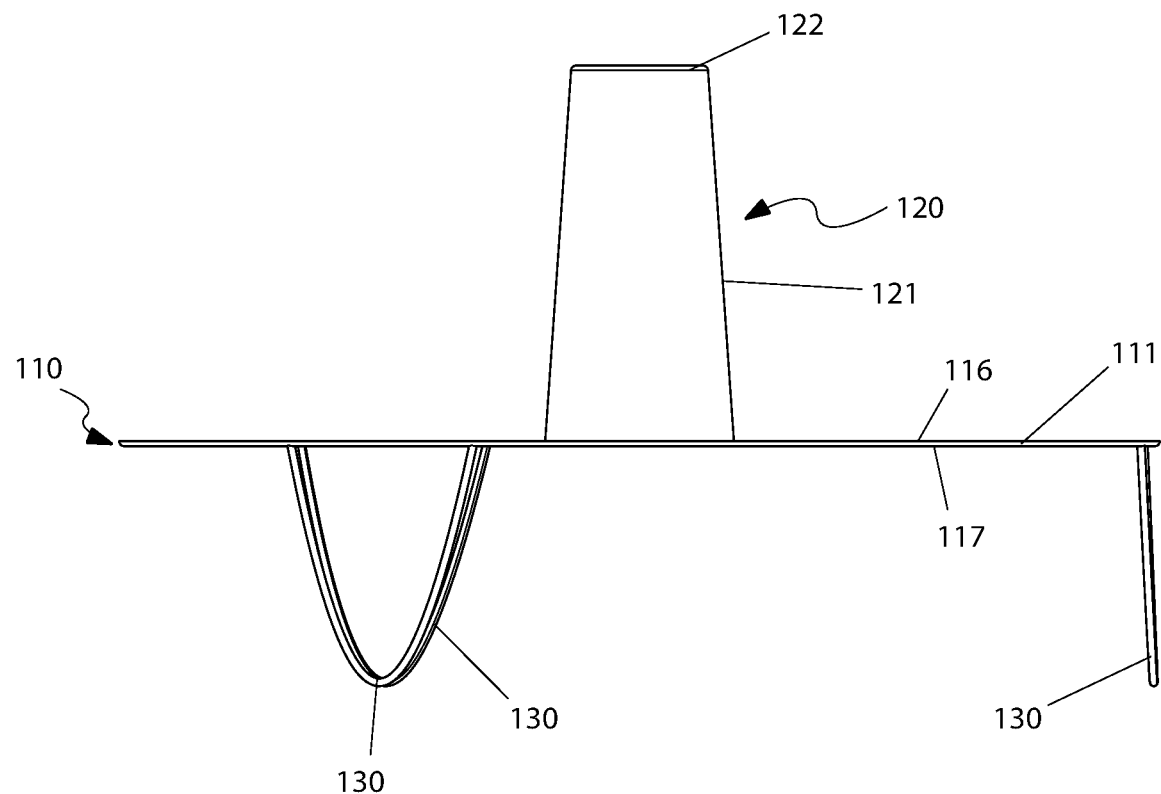
FIG. 5 is another side view of the steamer insert device, according to the preferred embodiment of the present invention.
Figure 6:
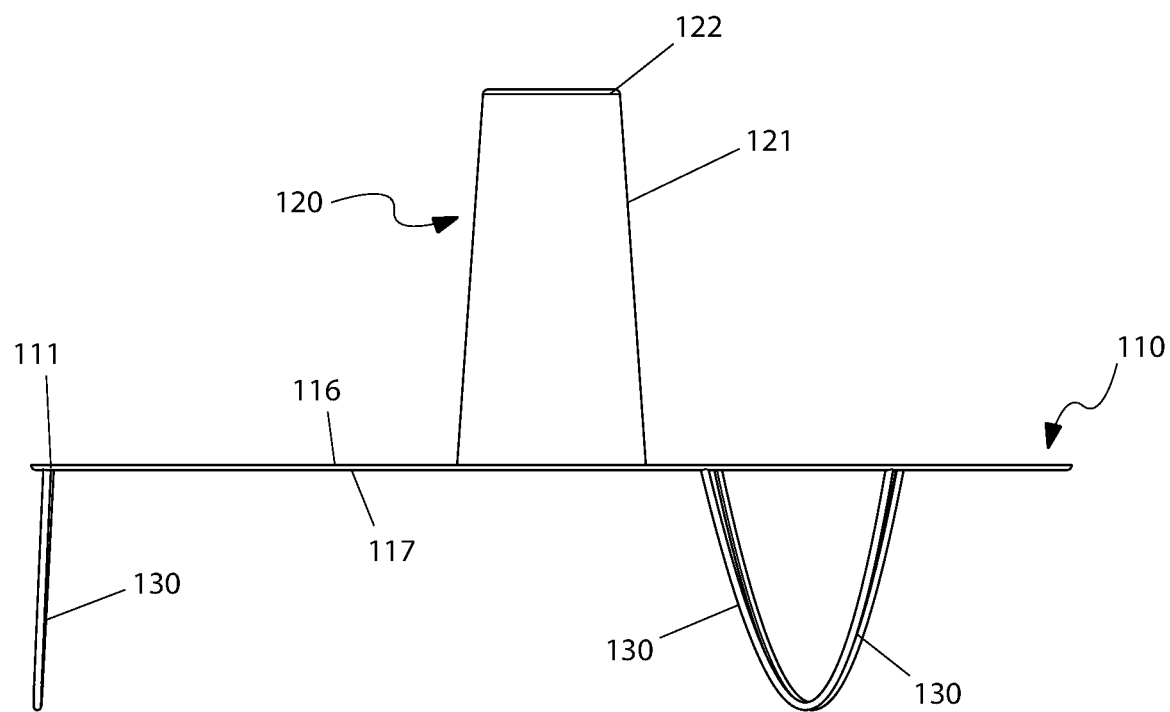
FIG. 6 is another side view of the steamer insert device, according to the preferred embodiment of the present invention.

Referring next to FIG. 2, top perspective view of the steamer insert device 100, according to the preferred embodiment of the present invention is depicted. Similar to FIG. 1, the steamer insert device 100 may include a support surface 110, a center cylinder 120, and elevator legs 130. The support surface 110 may again include an outer ridge 111 around the perimeter of the support surface 110, a top 116, a ring of outer steam apertures 112, middle steam apertures 113, and inner steam apertures 114. The inner steam apertures may also include at least one (1) enlarged aperture 115. The center cylinder 120 may include an elongated base 121 coupled to the support surface 110, a cylinder ridge 122, a cylinder rim 123, and a hole 124. The hole 124 is configured to receive refills of water therein and allow the water to funnel through the center cylinder 120 to a container of heated water beneath the device 100. The elevator legs 130 may include at least three (3) extension pieces of generally "V"-shaped metal suited to elevate the support surface 110 above heated water in a container. The elevator legs 130 may be spaced out in an equidistant manner around the bottom 117 of the support surface 110. The ring of inner steam apertures 114 include the enlarged apertures 115 disposed equidistant around the center cylinder 120 on the support surface 110.

Referring now to FIG. 3 through FIG. 6, an array of side views of the steamer insert device 100 are provided, according to the preferred embodiment of the present invention. The steamer insert device 100 may include a support surface 110, a center cylinder 120, and elevator legs 130. The elevator legs 130 may include at least three (3) extension pieces of generally "V"-shaped metal suited to elevate the support surface 110 above heated water in a container. The elevator legs 130 may be constructed from a tubular wire or metal material and further include a flattened inner edge. The support surface 110 may be configured as a flat metal surface suited for supporting a food item during steam cooking in a pot, kettle, or other similar container. The center cylinder 120 may be configured as a partial cone or graduated cylindrical protrusion having tapered edges. The center cylinder 120 may include a base 121 coupled to the support surface 110, a cylinder ridge 122, a cylinder rim 123, and a hole 124 (not shown). The center cylinder 120 may be configured with tapered sides to allow a food item to be stacked and supported in an upright or angled arrangement around the perimeter of the cylinder 120. Although dimensions may vary depending on the cooking pot used, the steamer insert device 100 may commonly be constructed with a base measuring approximately eleven inches (11 in.) in length. The center cylinder 120 may be configured with a base 121 of approximately two inches (2 in.) and a height of four inches (4 in.).

Figure 7:
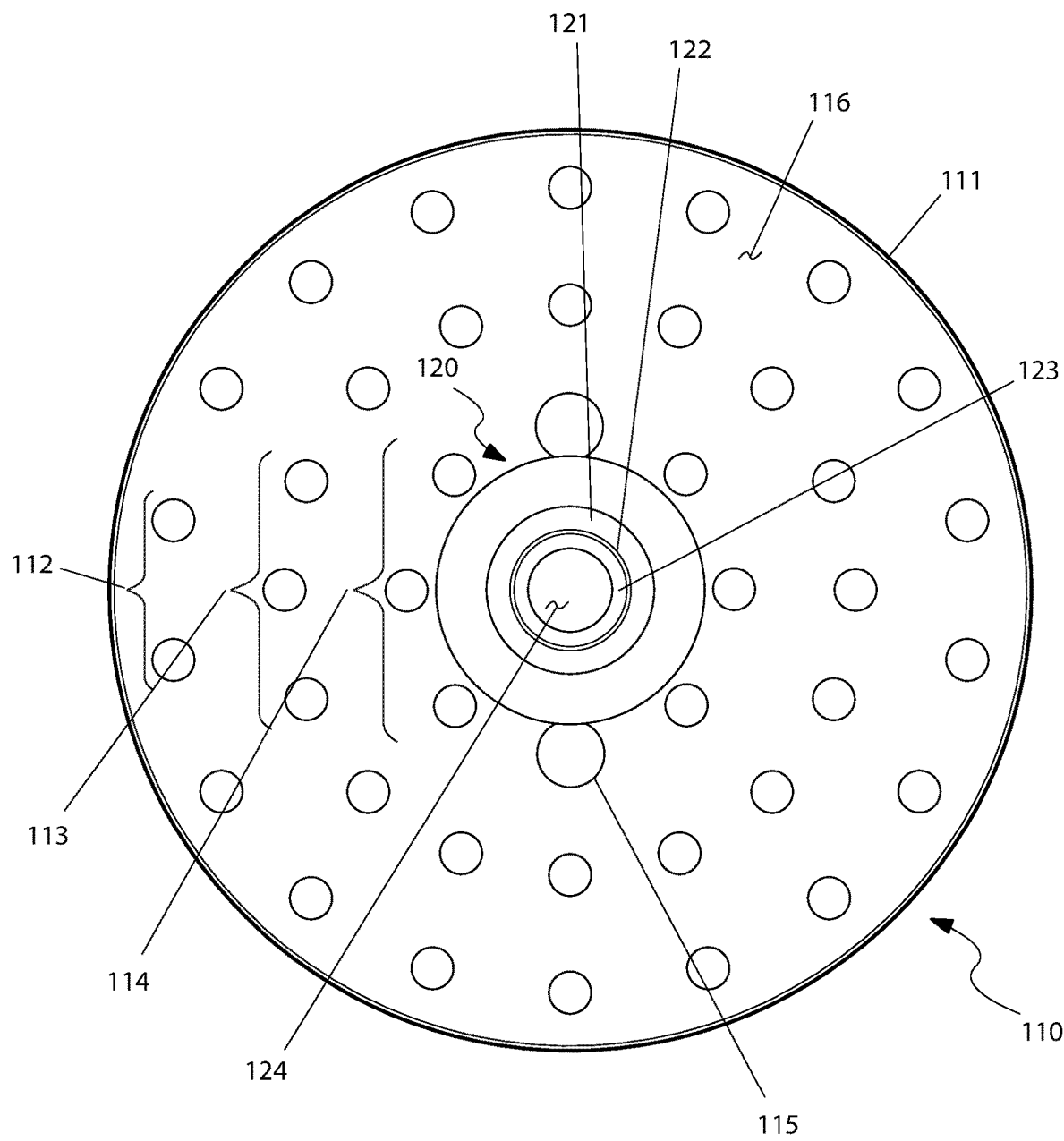
FIG. 7 is a top view of the steamer insert device, according to the preferred embodiment of the present invention; and, FIG. 8 is a bottom view of the steamer insert device, showing an opposing view from the device as illustrated in FIG. 7, according to the preferred embodiment of the present invention.

Referring next to FIG. 7, a top view of the steamer insert device 100, according to the preferred embodiment of the present invention is disclosed. The steamer insert device 100 may include a support surface 110, a center cylinder 120, and elevator legs 130 (not shown). The support surface 110 may be structured as a circular, flat metal surface having an outer ridge 111 around the perimeter of the support surface 110, a top 116, and three (3) rings of apertures concentrically surrounding the center cylinder 120 including a ring of outer steam apertures 112, middle steam apertures 113, and inner steam apertures 114. The inner steam apertures may also include at least one (1) enlarged aperture 115. The center cylinder 120 may be configured as a partial cone or generally cylindrical protrusion having tapered edges that narrow slightly as the center cylinder 120 extends orthogonally away from the support surface 110. The center cylinder 120 may include a base 121 coupled to the support surface 110, a cylinder ridge 122, a cylinder rim 123, and a hole 124. The cylinder ridge 122 surrounds the outer surface of the cylinder rim 123 and may act as a support for receiving an optional graduated cylinder extension piece there upon. The hole 124 is configured to receive refills of water therein and allow the water to funnel through the center cylinder 120 to a container of heated water beneath the device 100.

Figure 8:
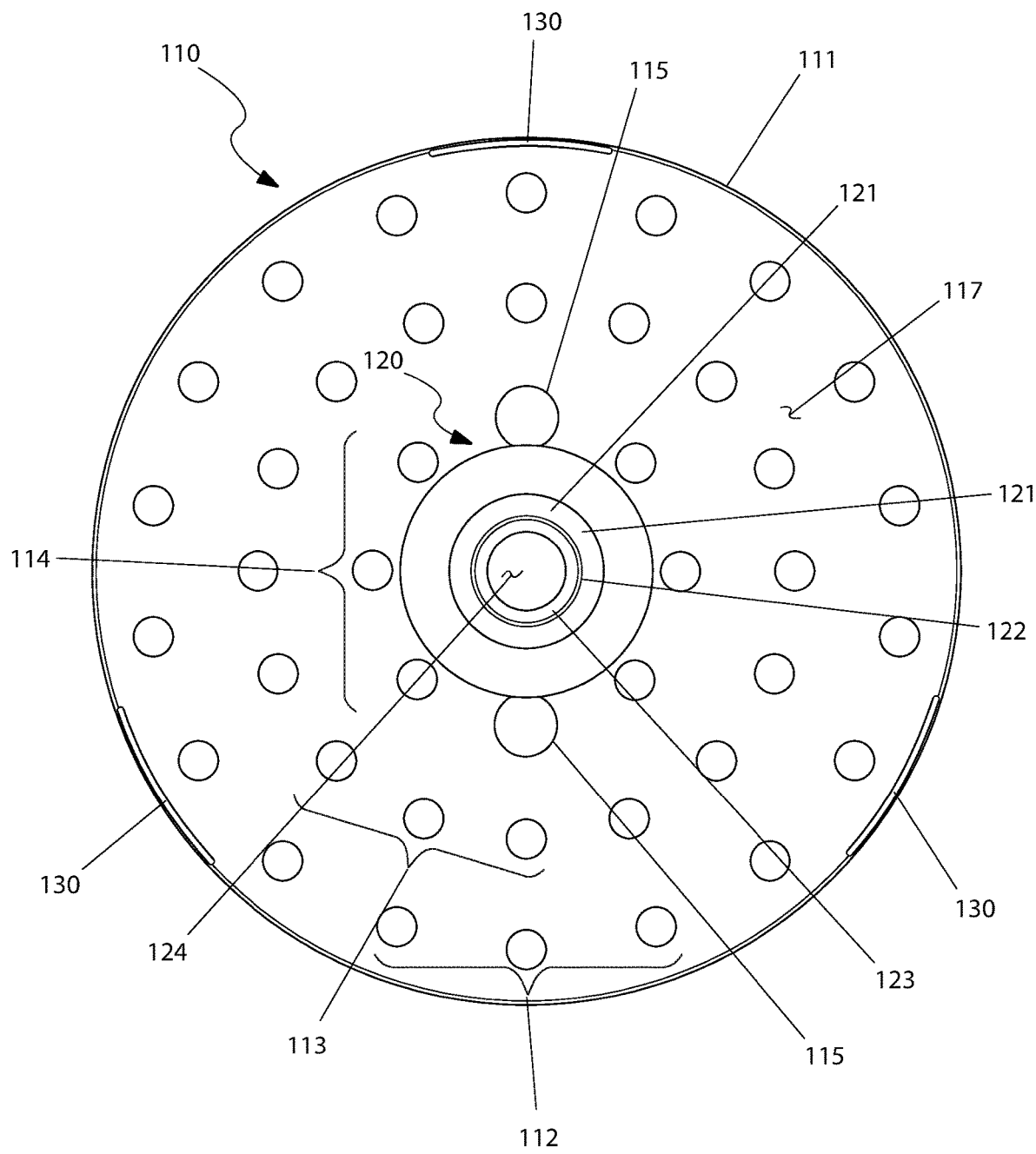

Referring next to FIG. 8 is a bottom view of the steamer insert device 100, showing an opposing view from the device 100 as illustrated in FIG. 7, according to the preferred embodiment of the present invention. The steamer insert device 100 may include a support surface 110, a center cylinder 120, and elevator legs 130. The support surface 110 may be structured as a circular, flat metal surface having an outer ridge 111 around the perimeter of the support surface 110, a top 116, and three (3) rings of apertures concentrically surrounding the center cylinder 120 including a ring of outer steam apertures 112, middle steam apertures 113, and inner steam apertures 114. The inner steam apertures may also include at least one (1) enlarged aperture 115. The center cylinder 120 may be configured as a partial cone or generally cylindrical protrusion having tapered edges that narrow slightly as the center cylinder 120 extends orthogonally away from the support surface 110. The center cylinder 120 may include a base 121 coupled to the support surface 110, a cylinder ridge 122, a cylinder rim 123, and a hole 124. As illustrated here, the center cylinder 120 may be generally hollow by design to serve as a reverse funnel for guiding poured fluids from the hole 124 to the cooking pot beneath the device 100. The cylinder ridge 122 surrounds the outer surface of the cylinder rim 123 and may act as a support for receiving an optional graduated cylinder extension piece there upon. The elevator legs 130 may include at least three (3) extension pieces of generally "V"-shaped metal suited to elevate the support surface 110 above heated water in a container. The elevator legs 130 allow steam from the heated water source to rise up through the apertures in the outer steam apertures 112, middle steam apertures 113, and inner steam apertures 114 to heat and cook a food item resting on the support surface 110.

2. OPERATION OF THE PREFERRED EMBODIMENT

The preferred embodiment of the present invention can be utilized by the common user in a simple and effortless manner with little or no training. It is envisioned that the steamer insert device 100 would be constructed in general accordance with FIG. 1 through FIG. 8. The user would procure the steamer insert device 100 through normal procurement channels, paying particular attention to the relevant specifications required for the cooking pot desired.

After procurement and prior to utilization, the steamer insert device 100 would be placed within a cooking pot. The cooking pot may then be filled with water for producing steam beneath and through the device 100. Food items such as tamales or other steamable items may then be stacked upright and inwardly facing against the center cylinder 120. Heat may be applied to the pot to produce boiling water below the steamer insert device 100. Periodically, a user may need to inspect the food items and then add additional water within the hole 124 of the center cylinder 120 of the device 100. The process may then be repeated as necessary or until the food items have been cooked to specification.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A steamer insert device, comprising:
a support surface having a flat surface with an outer ridge around a perimeter of the support surface, and a top;
a center cylinder having a base coupled to the support surface, a cylinder ridge, a cylinder rim, and a hole, the center cylinder having a partial cone having a plurality of tapered edges that narrow as the center cylinder extends orthogonally away from the support surface; and
a plurality of elevator legs having at least three extension pieces of metal to elevate the support surface above a plurality of heated water in a container;
further comprising three rings of apertures concentrically surrounding the center cylinder;
wherein the three rings of apertures include a ring of outer steam apertures, a ring of middle steam apertures, and a ring of inner steam apertures;
wherein the cylinder ridge surrounds the outer surface of the cylinder rim and acts as a support for receiving an optional graduated cylinder extension piece;
wherein the ring of inner steam apertures include a plurality of enlarged apertures disposed equidistant around the center cylinder on the support surface;
wherein the elevator legs are constructed from a tubular material and further include a flattened inner edge
wherein the support surface is circular;
wherein the support surface is made of metal;
wherein the center cylinder has a generally cylindrical protrusion;
wherein the hole receives one or more refills of water therein and allows the one or more refills of water to funnel through the center cylinder beneath the steamer insert device;
wherein the center cylinder is hollow to serve as a reverse funnel for guiding a plurality of poured fluids from the hole beneath the steamer insert device;
wherein one or more food items are stacked upright and are inwardly facing against the center cylinder;
wherein the elevator legs allow steam from the heated water to rise up through the apertures in the outer steam apertures, in the middle steam apertures, and in the inner steam apertures to heat and cook a food item resting on the support surface;
wherein the center cylinder has a base 2 ins. in width and 4 ins. in height;
wherein the elevator legs are spaced out in an equidistant manner on a bottom portion of the support surface;
wherein the elevator legs are made of a tubular wire;
wherein the elevator legs are made of a metal;
wherein the elevator legs have at least three extension pieces of generally "V"-shaped metal; and,
wherein the steamer insert device has a base 11 in. in diameter.

* * * * *